United States Patent
Matsumura et al.

(10) Patent No.: US 12,101,177 B2
(45) Date of Patent: Sep. 24, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Yuichi Kakishima, Palo Alto, CA (US); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 186 days.

(21) Appl. No.: 17/626,724

(22) PCT Filed: Jul. 19, 2019

(86) PCT No.: PCT/JP2019/028517
§ 371 (c)(1),
(2) Date: Jan. 12, 2022

(87) PCT Pub. No.: WO2021/014508
PCT Pub. Date: Jan. 28, 2021

(65) Prior Publication Data
US 2022/0263599 A1    Aug. 18, 2022

(51) Int. Cl.
*G06F 11/07* (2006.01)
*H04B 7/06* (2006.01)
*H04L 1/00* (2006.01)
*H04L 5/00* (2006.01)
*H04W 72/23* (2023.01)
*H04W 72/54* (2023.01)

(52) U.S. Cl.
CPC .......... *H04L 1/0013* (2013.01); *H04L 5/0048* (2013.01); *H04W 72/23* (2023.01); *H04W 72/54* (2023.01); *H04B 7/0639* (2013.01)

(58) Field of Classification Search
CPC .. H04L 1/0013; H04L 5/0048; H04W 72/042; H04W 72/08; H04B 7/0639
See application file for complete search history.

(56) References Cited

U.S. PATENT DOCUMENTS

| | | | |
|---|---|---|---|
| 10,201,005 B2* | 2/2019 | Yang | H04W 72/1215 |
| 2013/0058240 A1* | 3/2013 | Kim | H04L 5/0005 370/252 |
| 2015/0003359 A1* | 1/2015 | Hoshino | H04W 72/21 370/329 |
| 2017/0019924 A1* | 1/2017 | Wang | H04L 5/0092 |

(Continued)

OTHER PUBLICATIONS

International Search Report issued in PCT/JP2019/028517 on Aug. 27, 2019 (2 pages).

(Continued)

*Primary Examiner* — Guy J Lamarre
(74) *Attorney, Agent, or Firm* — Osha Bergman Watanabe & Burton LLP

(57) ABSTRACT

A terminal according to one aspect of the present disclosure includes: a receiving section that receives information related to a channel state information reference signal (CSI-RS) of a terminal according to an old release; and a control section that performs control of applying rate match or puncture to a specific channel or signal regarding a resource of the CSI-RS of the terminal according to the old release. According to one aspect of the present disclosure, even when there are terminals according to different releases, each of the terminals can appropriately perform communication.

6 Claims, 15 Drawing Sheets

(56) References Cited

U.S. PATENT DOCUMENTS

2019/0190572 A1* 6/2019 Osawa .................. H04W 80/02
2020/0015251 A1* 1/2020 Takeda ................ H04W 72/569
2024/0049222 A1* 2/2024 Fu ......................... H04L 5/0053

OTHER PUBLICATIONS

Written Opinion of the International Searching Authority issued in PCT/JP2019/028517 on Aug. 27, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

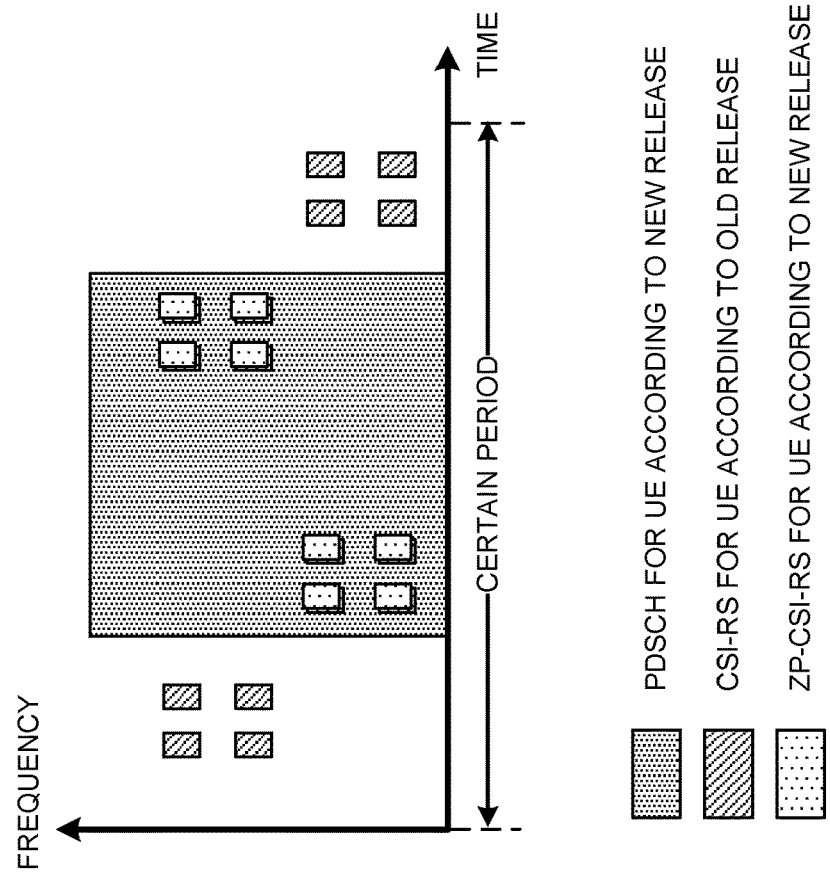
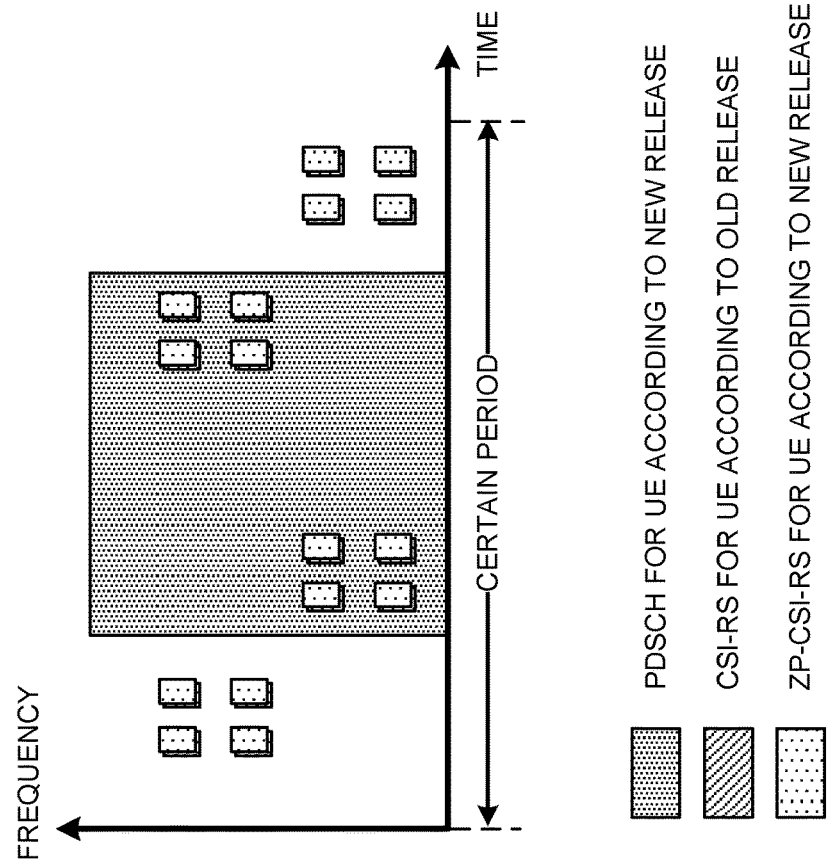

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a method of beam management is introduced. For example, for NR, forming (or using) beams in at least one of a base station and a user terminal (User Equipment (UE)) has been under study.

The beam is roughly categorized into a digital beam (digital precoding), whereby a plurality of beams can be simultaneously formed, and an analog beam (analog precoding), whereby up to one beam can be simultaneously formed.

It is assumed that, in future radio communication systems (for example, NR of Rel-17 or later versions), even in a high frequency, operation of only the digital beam without the use of the analog beam (which may be referred to as full digital operation) is used and operation implementing dominant use of the digital beam are used.

Even if the base station adopts full digital, the UE according to Rel-15 ought to be supported as far as the UE according to Rel-15 is present.

However, how to support the UE according to Rel-15 and the UE according to later releases (for example, the UE according to Rel-16, the UE according to Rel-17, and the like) in the base station (cell, network) supporting full digital has not yet been fully studied. If each of the UEs according to different releases cannot appropriately perform communication, increase of communication throughput may be prevented.

In the light of this, the present disclosure has an object to provide a terminal and a radio communication method that enable, even when there are terminals according to different releases, each of the terminals to appropriately perform communication.

Solution to Problem

A terminal according to one aspect of the present disclosure includes: a receiving section that receives information related to a channel state information reference signal (CSI-RS) of a terminal according to an old release; and a control section that performs control of applying rate match or puncture to a specific channel or signal regarding a resource of the CSI-RS of the terminal according to the old release.

Advantageous Effects of Invention

According to one aspect of the present disclosure, even when there are terminals according to different releases, each of the terminals can appropriately perform communication.

BRIEF DESCRIPTION OF DRAWINGS

FIGS. 10A and 10B are each a diagram to show an example of a ZP-CSI-RS configured for the UE according to a new release;

DESCRIPTION OF EMBODIMENTS (Beam Management)

In NR, a method of beam management is introduced. For example, for NR, forming (or using) beams in at least one of a base station and a UE has been under study.

Through application of beam forming (BF), it is expected that difficulty in securing coverage due to increase in carrier frequency be reduced, and radio wave propagation loss be reduced.

BF is, for example, a technique in which a beam (antenna directivity) is formed by controlling (also referred to as precoding) amplitude/phase of a signal that is transmitted or received from each element by using an ultra multi-element antenna. Note that Multiple Input Multiple Output (MIMO) using such an ultra multi-element antenna is also referred to as massive MIMO.

Figure 1:
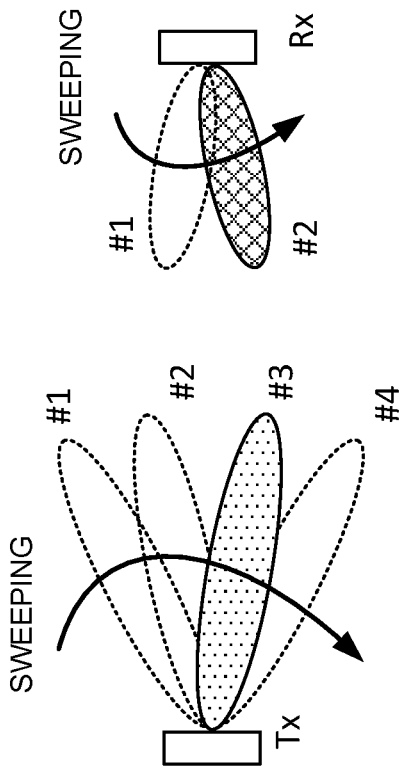
FIGS. 1A and 1B are each a diagram to show an example of a transmission and reception configuration in which beam management is used.

FIGS. 1A and 1B are each a diagram to show an example of a transmission and reception configuration in which beam management is used. The present example assumes a system in which a transmitter (Tx) side can form four beams (transmit beams #1 to #4), and a receiver (Rx) side can form two beams (receive beams #1 to #2).

In such a system, it is preferable that, as shown in FIG. 1A, sweeping of beams be performed in both of transmission and reception, and control be performed so that an appropriate pair is selected out of candidates of a total of eight patterns of transmit and receive beam pairs shown in FIG. 1B.

The pair of the transmit beam and the receive beam may be referred to as a beam pair, and for example, transmit beam #3 and receive beam #2 as shown in FIG. 1A may be identified as a beam pair candidate index=6 of FIG. 1B.

Note that, in beam management, a single beam is not used, and a plurality of levels of beam control, such as a rough beam and a fine beam, may be performed.

BF can be categorized into digital BF and analog BF. Digital BF and analog BF may be referred to as digital precoding and analog precoding, respectively.

Digital BF is, for example, a method in which precoding signal processing is performed on a baseband (for a digital signal). In this case, as many parallel processings, such as inverse fast Fourier transform (IFFT), digital to analog conversion (Digital to Analog Converter (DAC)), and Radio Frequency (RF), as the number of antenna ports (or RF chains) are required. At the same time, as many beams as the number of RF chains can be formed at any timing.

Analog BF is, for example, a method in which a phase shifter is used in RF. In analog BF, a plurality of beams cannot be formed at the same timing; however, a configuration thereof is easy and can be implemented at a low cost because it is only necessary that phase of RF signals be rotated.

Note that a hybrid BF configuration, which is a combination of digital BF and analog BF, can be implemented as well. In NR, introduction of massive MIMO has been under study. When forming of a great number of beams is intended to be performed by means of only digital BF, however, a circuit configuration costs much. Thus, use of the hybrid BF configuration is also assumed.

(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (which may be referred to as a signal/channel; hereinafter, in a similar manner, "A/B" may be interpreted as "at least one of A and B") based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information (SRI), or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A: Doppler shift, Doppler spread, average delay, and delay spread
QCL type B: Doppler shift and Doppler spread
QCL type C: Doppler shift and Average delay
QCL type D: Spatial reception parameter Types A to C may correspond to QCL information related to synchronization processing of at least one of time and frequency, and type D may correspond to QCL information related to beam control.

A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS (DL-RS) to have a QCL relationship with the channel may be, for example, at least one of a synchronization signal block (SSB), a channel state information reference signal (CSI-RS), and a reference signal for measurement (Sounding Reference Signal (SRS)). Alternatively, the DL-RS may be a CSI-RS used for tracking (also referred to as a Tracking Reference Signal (TRS)), or a reference signal used for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the DL-RS to have a QCL relationship (DL-RS relation information) and information indicating a QCL type (QCL type information). The DL-RS relation information may include information such as an index of the DL-RS (for example, an SSB index, or a non-zero power CSI-RS (NZP CSI-RS) resource ID (Identifier)), an index of a cell in which the RS is located, and an index of a Bandwidth Part (BWP) in which the RS is located.

(Development of MIMO Technology and Beam)

Incidentally, the MIMO technology has hitherto been used in a frequency bandwidth (or a frequency band) lower than 6 GHz. However, application even to a frequency band higher than 6 GHz in future has been under study.

Note that the frequency band lower than 6 GHz may be referred to as sub-6, frequency range (FR) 1, or the like. The frequency band higher than 6 GHz may be referred to as above-6, FR 2, a millimeter wave (mmW), FR 4, or the like.

Figure 2:
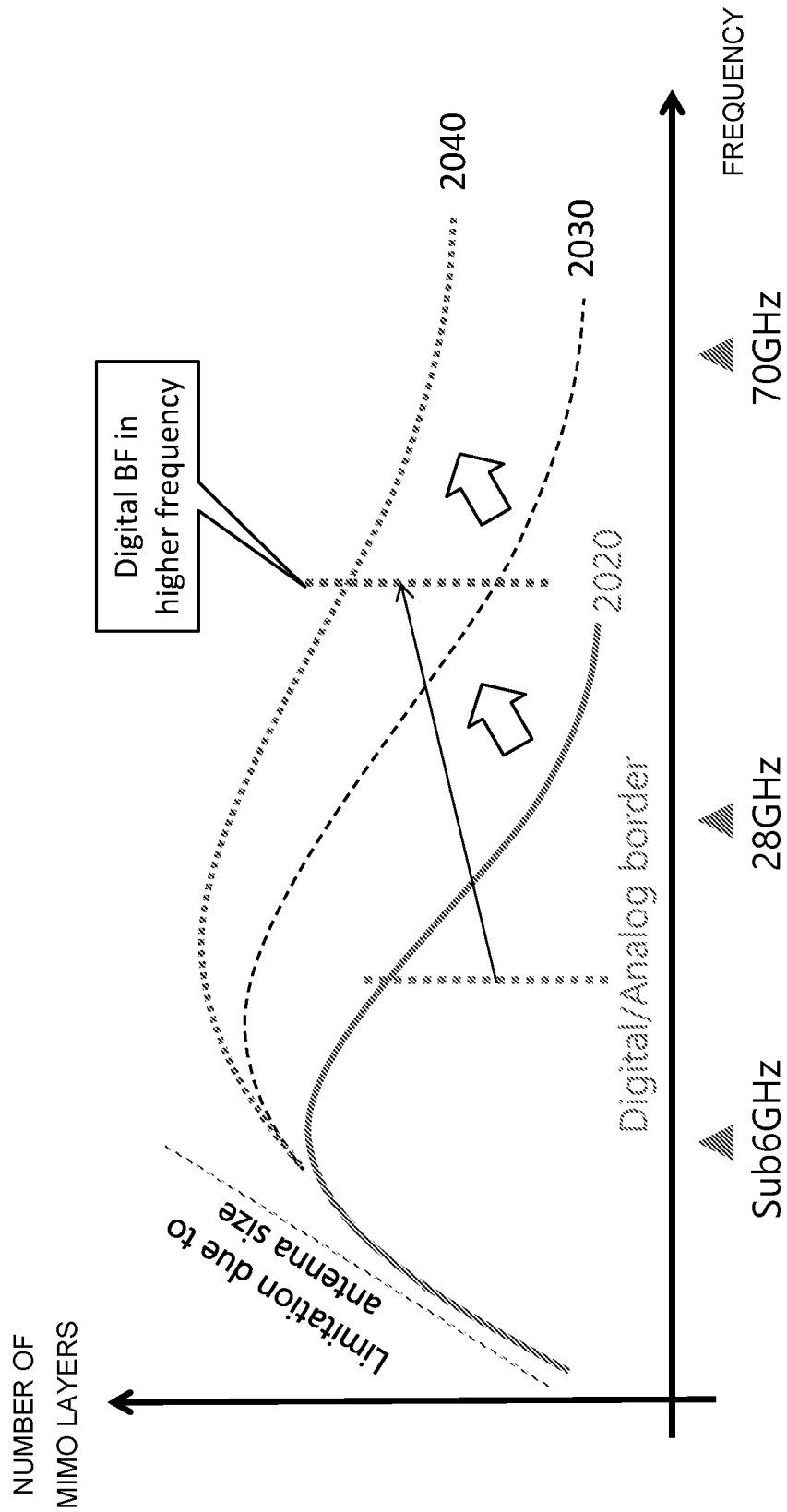
FIG. 2 is a diagram to show prediction of development of MIMO technology.

FIG. 2 is a diagram to show prediction of development of the MIMO technology. FIG. 2 shows an example in which how many MIMO layers can be implemented in each frequency in each decade (for example, 2020s, 2030s, and 2040s), with the horizontal axis representing frequency and the vertical axis representing the number of MIMO layers. It is assumed that the maximum number of MIMO layers is limited by an antenna size.

For example, the line of 2020s shows that the number of layers is the largest in a frequency band of around sub-6 GHz, and the number of layers is considerably small in a high frequency band such as 28 GHz. There is an application boundary of digital precoding and analog precoding around the middle of these frequency bands. In this decade, it is assumed that communication of sub-6 GHz can be implemented by using digital precoding, but communication around 28 GHz cannot be implemented. Note that analog precoding may be able to be applied regardless of the frequency band.

In around 2030s, it is assumed that, through adaptation of an advanced technique such as nonlinear precoding, the number of MIMO layers is generally increased, and in addition, precoding can be applied even in a higher frequency band. Thus, it is expected a line obtained by extending the line of 2020s in the upper right direction of the figure is the line of 2030s.

It is expected that the line of 2040s is a line obtained by extending the line of 2030s further in the upper right direction of the figure. In this decade, it is expected that communication of sub-6 GHz can be implemented by using digital precoding even in a frequency band higher than 28 GHz. It is assumed that the application boundary of digital precoding is shifted to a frequency band by far higher than that of 2020s.

It is expected that, even with mmW, through the use of MIMO of a higher order as well as cooperation of a plurality of UEs, the degree of freedom and diversity of MIMO multiplexing are enhanced, which further leads to enhancement of throughput.

In this manner, it is assumed that, in future radio communication systems (for example, NR of Rel-17 or later versions), even in a high frequency (for example, FR 2), operation of only the digital beam without the use of the analog beam (which may be referred to as full digital operation) is used and operation implementing dominant use of the digital beam are used.

For example, in a case of the full digital operation, by simultaneously applying orthogonal precoding (or an orthogonal beam, a digital beam) to a plurality of UEs, improvement of spectral efficiency can be expected. When the digital beam cannot be appropriately applied, interference between the UEs is increased, which leads to deterioration of communication quality (or reduction of cell capacity). Note that orthogonality according to the present disclosure may be interpreted as semi-orthogonality.

Figure 3A:
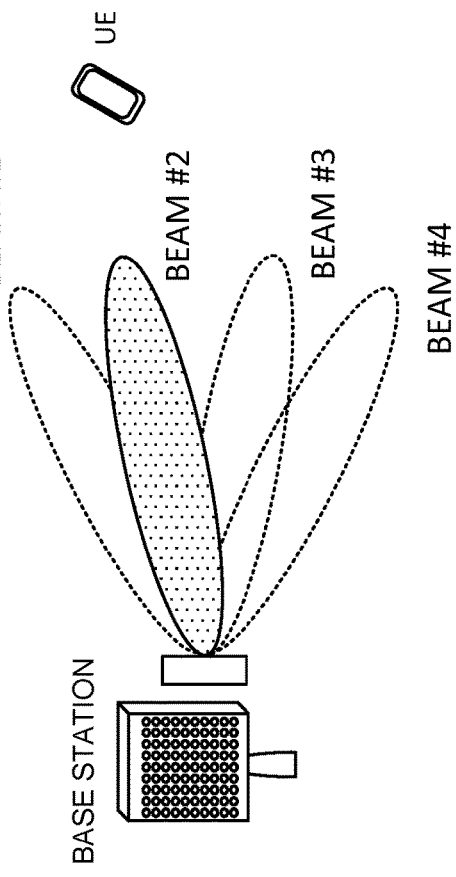
FIGS. 3A and 3B are each a diagram to show an example of operation of beams.
Figure 3B:
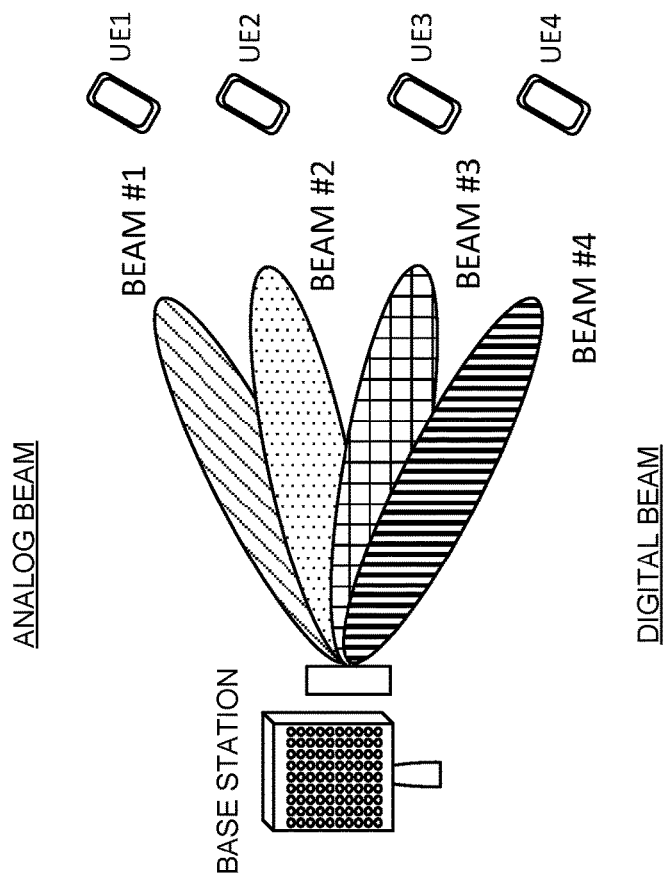

FIGS. 3A and 3B are each a diagram to show an example of operation of beams. In the present example, FR 2 is assumed. However, the frequency range of the present disclosure is not limited to this. FIG. 3A shows an operation of the analog beams that are also used in Rel-15, and FIG. 3B shows an operation of the digital beams that are used in Rel-17 or later versions.

In FIG. 3A, the base station (which may be interpreted as a transmission/reception point (TRP), a panel, or the like) can only transmit one beam (beam #2 in FIG. 3A) at certain time. Thus, the base station performs transmission and reception by switching beams for the UE.

In FIG. 3B, the base station can transmit a plurality of beams (beams #1 to #4 in FIG. 3B) at certain time. Thus, the base station can perform transmission and reception to and from a plurality of UEs by using different beams simultaneously.

Even if the base station adopts full digital, the UE according to Rel-15 is desired to be supported as far as the UE according to Rel-15 is present.

However, how to support the UE according to Rel-15 and the UE according to later releases (for example, the UE according to Rel-16, the UE according to Rel-17, and the like) in the base station (cell, network) supporting full digital has not yet been fully studied. For example, in FIG. 3A, if UE 1 is a Rel-15 UE and UEs 2 to 4 are each a Rel-17 UE, based on which assumption each of the UEs performs processing is not made clear in present specifications.

If the UE cannot appropriately process the signal/channel to which precoding (beam) is applied, increase of communication throughput may be prevented.

In the light of this, the inventors of the present invention came up with the idea of a method for the UE to appropriately process the signal/channel to which precoding (for example, a digital beam) is applied.

Embodiments according to the present disclosure will be described below in detail with reference to the drawings. A radio communication method according to each embodiment may be applied individually, or may be applied in combination.

Note that "release" according to the present disclosure may mean release of 3GPP specifications.

(Radio Communication Method)

The following will provide description of a first embodiment in which a UE of a future release (UE according to a new release) is connected to a serving cell different from that of a UE according to Rel. 15 and a second embodiment in which a UE of a future release is connected to a serving cell the same as that of a UE according to Rel. 15.

Note that "to be connected to a serving cell" according to the present disclosure may be interchangeably interpreted as to perform communication by using the serving cell (for example, to perform transmission or reception), to use the serving cell, or the like.

"A UE of a future release is connected to a serving cell different from that of a UE according to Rel. 15" may mean that the serving cell connected by the UE of a future release has a cell ID different from that of the serving cell connected by the UE according to Rel. 15, or may mean that radio resources (for example, time and frequency resources) used by the UE of a future release and the UE according to Rel. 15 do not overlap each other.

"A UE of a future release is connected to a serving cell the same as that of a UE according to Rel. 15" may mean that the serving cell connected by the UE of a future release has a cell ID the same as the serving cell connected by the UE according to Rel. 15, or may mean that radio resources (for example, time and frequency resources) used by the UE of a future release and the UE according to Rel. 15 at least partially overlap each other.

Figure 4:
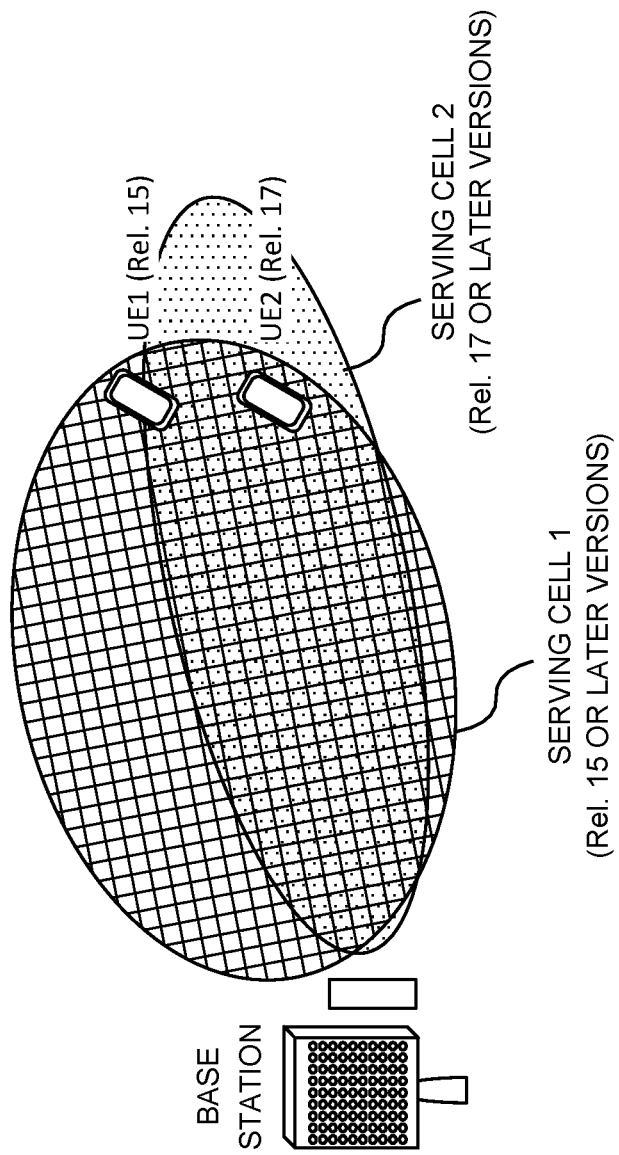
FIG. 4 is a diagram to show an example of a configuration according to a first embodiment.

FIG. 4 is a diagram to show an example of a configuration according to a first embodiment. In the present example, UE 1 being the UE according to Rel. 15 may be connected to serving cell 1 that supports at least Rel. 15, and UE 2 being the UE according to Rel. 17 may be connected to serving cell 2 that supports at least Rel. 17. In the present example, the same TRP, panel, or base station forms both of the cells, but this is not restrictive.

According to such a configuration as described above, compatibility between releases need not be taken into account considerably. At the same time, there is a high probability that two serving cells are supported in an overlapping region (which may be referred to as a sector, a cell, or the like), and thus interference between serving cells is required to be reduced.

Figure 5:
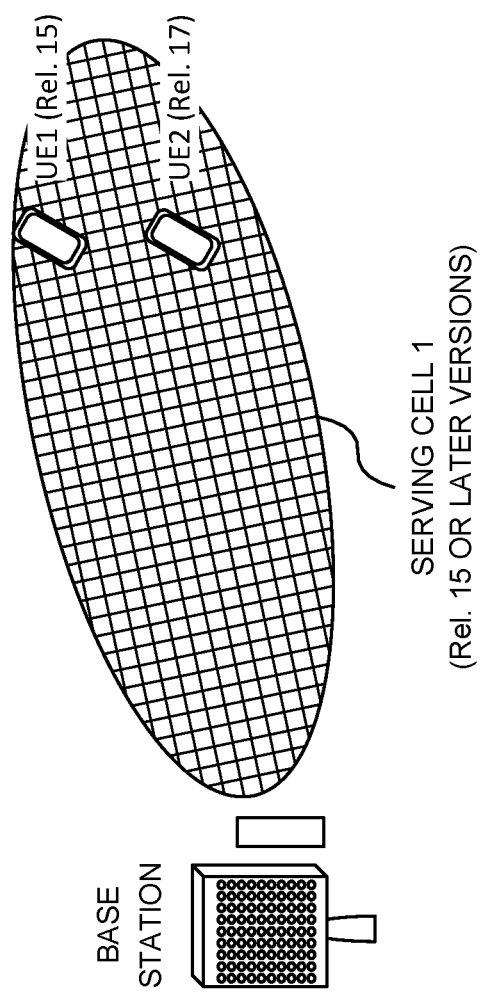
FIG. 5 is a diagram to show an example of a configuration according to a second embodiment.

FIG. 5 is a diagram to show an example of a configuration according to a second embodiment. In the present example, both of UE 1 being the UE according to Rel. 15 and UE 2 being the UE according to Rel. 17 may be connected to serving cell 1 that supports at least Rel. 17.

According to such a configuration as described above, compatibility between releases (in particular, control related to beam reporting/control or control related to CSI measurement/reporting) needs to be taken into account. Support that assumes coexistence of UEs according to different releases in one serving cell is required.

In the present disclosure, the following description is given based on the assumption that a "UE according to an old release" means a UE according to Rel. 15 NR and a "UE according to a new release" means a UE according to NR of later than Rel. 15 (for example, a UE according to Rel. 16 or a UE according to Rel. 17). However, this is not restrictive.

For example, it may mean a UE whose maximum or configurable number of ports (for example, the number of ports of the CSI-RS, the number of ports of the SRS, or the number of ports of the DMRS for at least one of the PUSCH, the PDSCH, the PDCCH, and the PUCCH) of a specific reference signal is a certain number with respect to the "UE according to an old release", and the "UE according to a new release" may mean a UE whose number of ports of the specific reference signal is larger than the "UE according to an old release". The "UE according to a new release" may mean a UE having capability different from that of the "UE according to an old release".

When there is a description of the term "UE" by itself, the "UE" may be interpreted as at least one of the "UE according to an old release" and the "UE according to a new release".

Note that, when a certain higher layer parameter (for example, "interference control"=enabled) is configured for a certain cell/BWP, the UE may assume that, in the cell/BWP, radio resources different from those of another serving cell are allocated (first embodiment) or that resources overlapping with those of another serving cell are allocated (second embodiment).

In the present disclosure, "a certain higher layer parameter is configured" may be interchangeably interpreted as "'interference control'=enabled is configured".

First Embodiment

In the first embodiment, the UE may assume that different (or non-overlapping) radio resources (for example, time/frequency resources) are allocated (scheduled) for a serving cell (which may be hereinafter referred to as a first serving cell) that is used by the UE according to an old release and a serving cell (which may be hereinafter referred to as a second serving cell) that is used by the UE according to a new release.

Here, the frequency resources different for each serving cell may be in the unit of the BWP, or may be in the unit of the allocation frequency resource (for example, the physical resource block (PRB), the subband, the subcarrier, or the like) in the BWP.

The time resources different for each serving cell may be in the unit of a certain period, for example, may be in the unit of the slot, the sub-slot, the subframe, or the like, or may be in the unit of the allocation time resource (for example, the symbol) included in at least one of the slot, the sub-slot, the subframe, or the like.

The serving cell according to the present disclosure may be interpreted as the frequency resource such as the BWP, the PRB, the subband, and the subcarrier, or may be interpreted as the time resource such as the slot, the sub-slot, and the subframe.

Figure 6A:
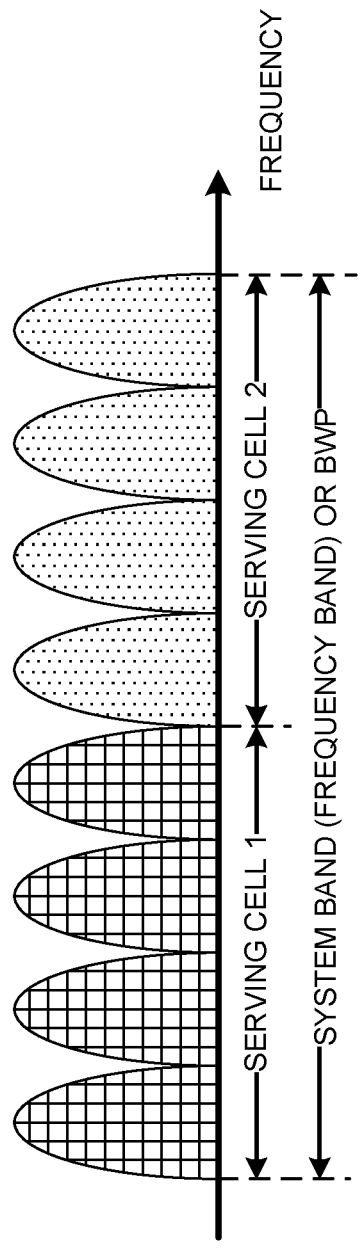
FIGS. 6A and 6B are each a diagram to show an example of radio resources for each serving cell according to the first embodiment.
Figure 6B:
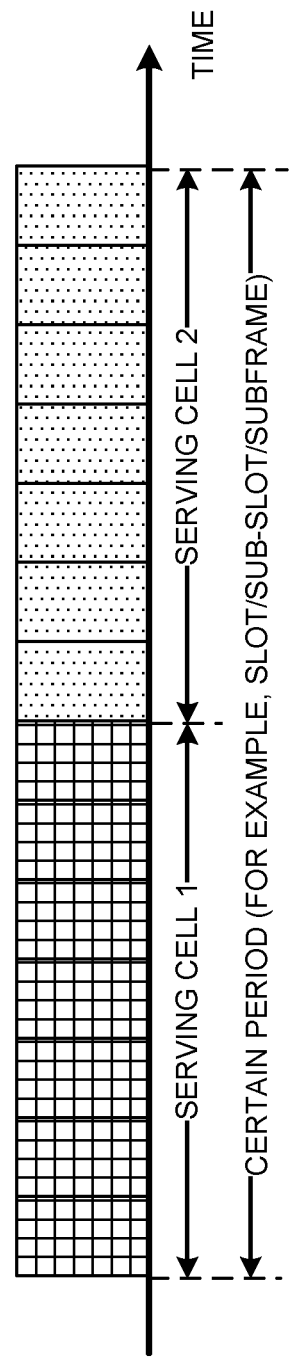

FIGS. 6A and 6B are each a diagram to show an example of radio resources for each serving cell according to the first embodiment. FIG. 6A shows an example of the frequency resources different for each serving cell, and FIG. 6B shows an example of the time resources different for each serving cell.

In FIG. 6A, in a certain system band or BWP, communication of serving cell 1 (for example, a serving cell for the UE according to an old release) is performed by using lower frequency resources, and communication of serving cell 2 (for example, a serving cell of the UE according to a new release) is performed by using higher frequency resources.

In FIG. 6B, in a certain period, communication of serving cell 1 (for example, a serving cell for the UE according to an old release) is performed by using earlier time resources, and communication of serving cell 2 (for example, a serving cell of the UE according to a new release) is performed by using later time resources.

Note that, regarding the radio resources used by the UE according to a new release and the radio resources used by the UE according to an old release, either one of or both of them may be included at certain time, or either one of or both of them may be included in a certain frequency.

For the UE, information of radio resources (for example, certain time/frequency resources) used by the serving cell connected by another UE that is different from the serving cell connected by the UE may be configured by using higher layer signaling or the like. Note that the radio resources used by the serving cell connected by such another UE may be referred to as reserved resources, unavailable resources, protected resources, blanked resources, or the like (hereinafter referred to as reserved resources).

In the reserved resources, the UE may apply processing/ assumption of the interference control regarding the serving cell connected by the UE itself. Note that the radio resources used by the serving cell connected by the UE itself may be referred to as reserved resources.

Figure 7:
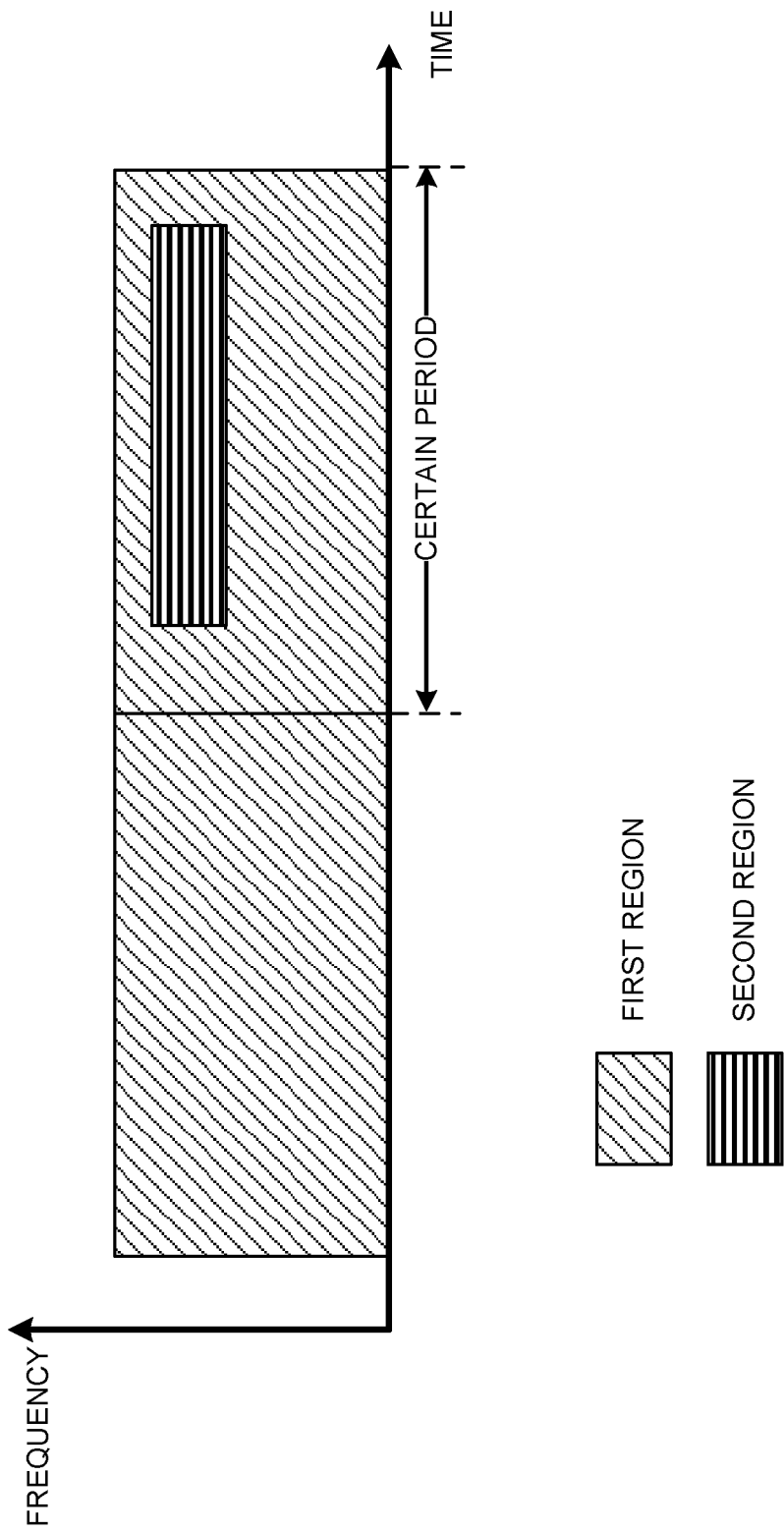
FIG. 7 is a diagram to show an example of reserved resources according to the first embodiment.

FIG. 7 is a diagram to show an example of reserved resources according to the first embodiment. In the present example, the first region is a region (resource) that is configured as a normal BWP. Regarding the first region, in particular, the UE need not assume limitation of communication. The first region may correspond to a region in which the interference control is not applied.

The second region may be the reserved resource, or may be a region (resource) that is configured for the interference control. In FIG. 7, a part of the time frequency resources of the first region in a certain period shown in the figure is configured as a second region.

The UE may assume that the entire time frequency resources corresponding to the certain period of FIG. 7 are the resources (reserved resources) for the serving cell connected by another UE, and the time frequency resources other than the certain period are the resources for the serving cell connected by the UE itself.

The UE may assume that the time frequency resources corresponding to the second region of FIG. 7 are resources (reserved resources) for the serving cell connected by such another UE, and the time frequency resources of the first region other than the second region are the resources for the serving cell connected by the UE itself.

In the cell/BWP in which the certain higher layer parameter (for example, "interference control"=enabled) is configured, which period (for example, the slot, the sub-slot, or the subframe) corresponds to the reserved resource (in which period the processing/assumption of the interference control is applied) may be configured for or reported to the UE by using higher layer signaling (for example, the RRC or the MAC), physical layer signaling (for example, the DCI), or a combination of these, or may be a value of an index (slot index or the like) indicating a period of the reserved resource may be defined in a specification in advance.

Information of the time resources to which the processing/ assumption of the interference control is applied may be, for example, reported to the UE by being included in TDD Config information (TDD UL-DL configuration information).

[Limiting Transmission and Reception of Reserved Resources]

The UE may assume that communication (transmission and reception) in the reserved resources is to be limited. The UE may assume that specific communication is not to be scheduled in the reserved resources or that the UE does not perform specific communication, for example, in the cell/ BWP in which the certain higher layer parameter (for example, "interference control"=enabled) is configured.

Note that "to not perform specific communication" may be interpreted as "to not transmit, not receive, or not monitor a specific channel/signal, or to regard the specific channel/ signal as a blank, or to drop the specific channel/signal", for example.

For example, the UE for which "interference control"=enabled is configured regarding the serving cell connected by the UE itself may assume that a shared channel (PDSCH/PUSCH) is not to be scheduled regarding the reserved resources. If the PDSCH/PUSCH is scheduled in the reserved resources, the UE need not transmit and receive the PDSCH/PUSCH in the reserved resources.

In this case, in consideration of non-scheduling of the PDSCH/PUSCH in the reserved resources, the UE may assume that the bit size of a certain field (for example, a time domain resource allocation field or the like) of the DCI related to the reserved resources is smaller than that of Rel. 15 (including 0 bits). According to such a configuration as described above, reduction in interference, extension of coverage of the DCI, and the like are expected.

Note that the UE for which "interference control"=enabled is configured regarding the serving cell connected by the UE itself may assume that the UE does not monitor the PDCCH for scheduling the PDSCH/PUSCH in the reserved resources in the serving cell.

For a signal (for example, an RS) that is not data, a sequence having small interference (small correlation) may be used. The UE may assume that the sequence of the RS is generated so that a different sequence is used for each serving cell.

The UE may assume that the UE can transmit and receive a part or all of the RSs (for example, the RSs of some types or of any type) in the serving cell connected by the UE itself in the reserved resources. The UE may assume that the UE can transmit and receive the CSI-RS/SRS in the serving cell connected by the UE itself in the reserved resources. The UE may assume that the UE can transmit and receive the CSI-RS/SRS of a specific type out of the CSI-RS/SRS in the reserved resources.

For example, the UE may assume that the UE cannot transmit and receive the RS (for example, the semi-persistent (SP) RS, or the periodic (P) RS) other than the aperiodic RS in the serving cell connected by the UE itself but can transmit and receive only the aperiodic RS in the reserved resources. This is because, when the base station capable of cooperation between the cells is used, the aperiodic RS (for example, the aperiodic CSI-RS (A-CSI-RS)/aperiodic SRS (A-SRS)) can be triggered by using resources that do not collide with each other between the cells.

The UE may assume that the UE cannot transmit and receive the aperiodic RS in the serving cell connected by the UE itself but can transmit and receive the RS other than the aperiodic RS in the reserved resources. This is because, when the base station knows occupying resources of neighboring cells regarding the (S) P-CSI-RS/(S) P-SRS in advance, the cell of the base station can schedule the PDSCH/PUSCH avoiding these resources of the neighboring cells.

The UE may assume that the UE can receive the SSB in the serving cell connected by the UE itself in the reserved resources. This is because it is preferable that the SSB be able to be used for initial access, random access control, or the like also in the serving cell connected by the UE itself.

The UE may assume that the UE does not receive the SSB (that the SSB is not transmitted) in the serving cell connected by the UE itself in the reserved resources. This can reduce interference given to the neighboring cells by the SSB of the serving cell connected by the UE itself.

The UE may assume that the UE can receive the PDCCH in the serving cell connected by the UE itself in the reserved resources. For example, the UE for which the CORESET/search space set is configured so as to overlap the reserved resources may perform monitoring (blind detection) of the PDCCH in the reserved resources.

The UE may assume that the UE does not receive the PDCCH in the serving cell connected by the UE itself in the reserved resources. For example, the UE for which the CORESET/search space set is configured so as to overlap the reserved resources need not perform monitoring of the PDCCH in the reserved resources.

The UE may assume that the UE does not monitor the PDCCH only in the part (resource) included in the reserved resources regarding the configured CORESET/search space set.

The UE may assume that the UE does not monitor the PDCCH only in the OFDM symbol overlapping the reserved resources regarding the configured CORESET/search space set.

If there is an OFDM symbol overlapping the reserved resources regarding the configured CORESET/search space set, the UE may assume that the UE does not monitor the PDCCH in the slot including the symbol.

[Limiting Power of Reserved Resources]

The UE may assume that power/energy of communication in the reserved resources is to be limited. The UE may perform power control of specific communication in the reserved resources in the cell/BWP for which the certain higher layer parameter (for example, "interference control"=enabled) is configured.

Note that "to perform power control of specific communication" may be interpreted as to apply, inside of the reserved resources, power control different from transmission and reception outside of the reserved resources regarding a specific channel/signal.

For example, the UE may assume that at least one of transmission power, received power, and energy between a channel/signal transmitted and received inside of the reserved resources (second region) and the same channel/signal transmitted and received outside of the reserved resources (first region) is different from each other.

Regarding at least one of transmission power, received power, and energy, a value related to each region, a ratio between a value of the first region and a value of the second region, or the like may be defined in a specification in advance, or may be configured for or reported to the UE by using higher layer signaling (for example, the RRC or the MAC), physical layer signaling (for example, the DCI), or a combination of these.

The ratio may be a ratio between the same channels (or the same signals), or may be a ratio between different channels or between a certain channel and a certain signal.

Note that the UE may receive reporting as to information related to the interference control in the reserved resources (for example, whether or not the reserved resources are regarded as a blank, whether or not different transmission power control is used for each reserved resource, or the like) from a network (for example, the base station) by using higher layer signaling or the like. The information related to the interference control may be configured independently of each channel/signal, or may be configured for some channels/signals in common.

When the reserved resources are configured, the UE may assume that certain interference control is constantly applied (a default interference control method may be defined).

[Fallback to Rel. 15 Cell]

For each serving cell/BWP, information of 3GPP release (for example, "Rel. X or later versions" or the like) to be applied to the serving cell/BWP may be configured (reported). The information of 3GPP release to be applied to the serving cell/BWP may be configured (reported) by using higher layer signaling (for example, the RRC, the MAC, or the broadcast information (the MIB or the SIB)) or the like. The information of 3GPP release may be referred to as information of 3GPP release to be supported.

The UE may determine whether the serving cell/BWP supports the UE according to an old release or supports the UE according to a new release, based on the information.

The UE may determine whether the serving cell/BWP supports the UE according to an old release or supports the UE according to a new release, based on that the parameter not defined in a specification of Rel. 15 is configured regarding a certain serving cell/BWP.

The UE for which the serving cell (second serving cell) used by the UE according to a new release is configured may measure communication quality related to the serving cell (first serving cell) used by the UE according to an old release, based on a certain RS.

The communication quality may be at least one of received power (for example, Reference Signal Received Power (RSRP)), received quality (for example, Reference Signal Received Quality (RSRQ), a Signal to Interference plus Noise Ratio (SINR), a Signal to Noise Ratio (SNR)), signal strength (for example, a Received Signal Strength Indicator (RSSI)), channel information (for example, CSI), interference power, and the like.

The certain RS may be, for example, at least one of the SSB, the CSI-RS, the TRS, the DMRS of a certain channel (the PDCCH, the PDSCH, or the like), a cell-specific reference signal (CRS), and the like.

The resources for the certain RS for measurement may be configured (reported) by using higher layer signaling, physical layer signaling, or a combination of these. Note that the RS resources used when the resources of the certain RS for measurement are not configured may be determined by a specification.

The UE according to a new release may be preferentially connected to the second serving cell.

The UE connected to the second serving cell may perform fallback (which may be interpreted as handover) to the first serving cell, or may assume that fallback to the first serving cell is indicated from a network, when any one or a combination of the following conditions is satisfied:

Required quality/power of the second serving cell is equal to or less than a certain value Required quality/power of the first serving cell is equal to or greater than a certain value There is an error in data of the DL/UL of the second serving cell with the number of times that is equal to or greater than a certain value or frequency that is equal to or greater than a certain value (in other words, the number of times/frequency in which the Negative Acknowledgement (NACK) is transmitted and received in the Hybrid Automatic Repeat reQuest (HARQ) is equal to or greater than the certain value)

The number of times/frequency in which a Modulation and Coding Scheme (MCS) index of the DL/UL of the second serving cell is within a range of specific values is equal to or greater than a certain value (for example, this is because it can be assumed that quality has deteriorated when low MCS frequently occurs)

The certain value, the range of the specific values, and the like may be configured for the UE by using higher layer signaling or the like.

For each serving cell/BWP, information of 3GPP release (for example, "Rel. X or later versions" or the like) to be applied to the serving cell/BWP may be configured. The UE may determine whether the serving cell/BWP supports the UE according to an old release or supports the UE according to a new release, based on the information.

Note that when the UE receives the information of 3GPP release to be supported by using, for example, broadcast information (the PBCH, the MIB, the SIB, or the like) from a certain serving cell and the 3GPP release to be supported by the serving cell is not included in the 3GPP release supported by the UE, the UE need not perform connection to the serving cell. In this case, for example, the UE need not perform a random access procedure (including PRACH transmission) to the serving cell.

The UE may connect to both of the first serving cell and the second serving cell by using at least one of carrier aggregation and dual connectivity. The UE may assume that specific channels (for example, the PDSCHs) are simultaneously connected (simultaneously transmitted and received) regarding these two cells.

When the UE connects to both of the first serving cell and the second serving cell, the UE may determine from which of the serving cells the DL/UL data is scheduled (which may be interpreted as, for example, from which of the serving cells the DL data is received, to which of the serving cells the UL data is transmitted, in which of the serving cells the PDCCH is monitored, or the like), based on a specific bit field of the DCI.

When the UE connects to both of the first serving cell and the second serving cell, the UE may determine from which of the serving cells the DL/UL data is scheduled, based on blind detection of the DCI (for example, at least one of the following).

In which CORESET/search space set the DCI has been detected

Which DCI format has been detected

With which radio network temporary indicator (Radio Network Temporary Identifier (RNTI)) the DCI has been detected Regarding each of the first serving cell and the second serving cell, information (which may be referred to as a UE-specific RRC parameter) such as type/position of a certain RS (for example, the DMRS) may be individually configured for the UE by using higher layer signaling or the like, and the UE may determine which UE-specific RRC parameter is to be used, based on a field of the DCI or the blind detection of the DCI.

Regarding each of the first serving cell and the second serving cell, an MCS table may be individually configured for the UE by using higher layer signaling or the like, and the UE may determine which MCS table is to be used, based on a field of the DCI or the blind detection of the DCI.

According to the first embodiment described in the above, even when the UE according to a new release connects to a serving cell different from that of the UE according to an old release, each UE can perform appropriate communication.

Second Embodiment

In a second embodiment, the UE may assume that the same or overlapping radio resources (for example, time/frequency resources) are allocated (scheduled) for the serving cell (first serving cell) used by the UE according to an old release and the serving cell (second serving cell) used by the UE according to a new release.

For the Rel. 15 UE, operation according to a Rel. 15 NR specification needs to be configured.

Figure 8:
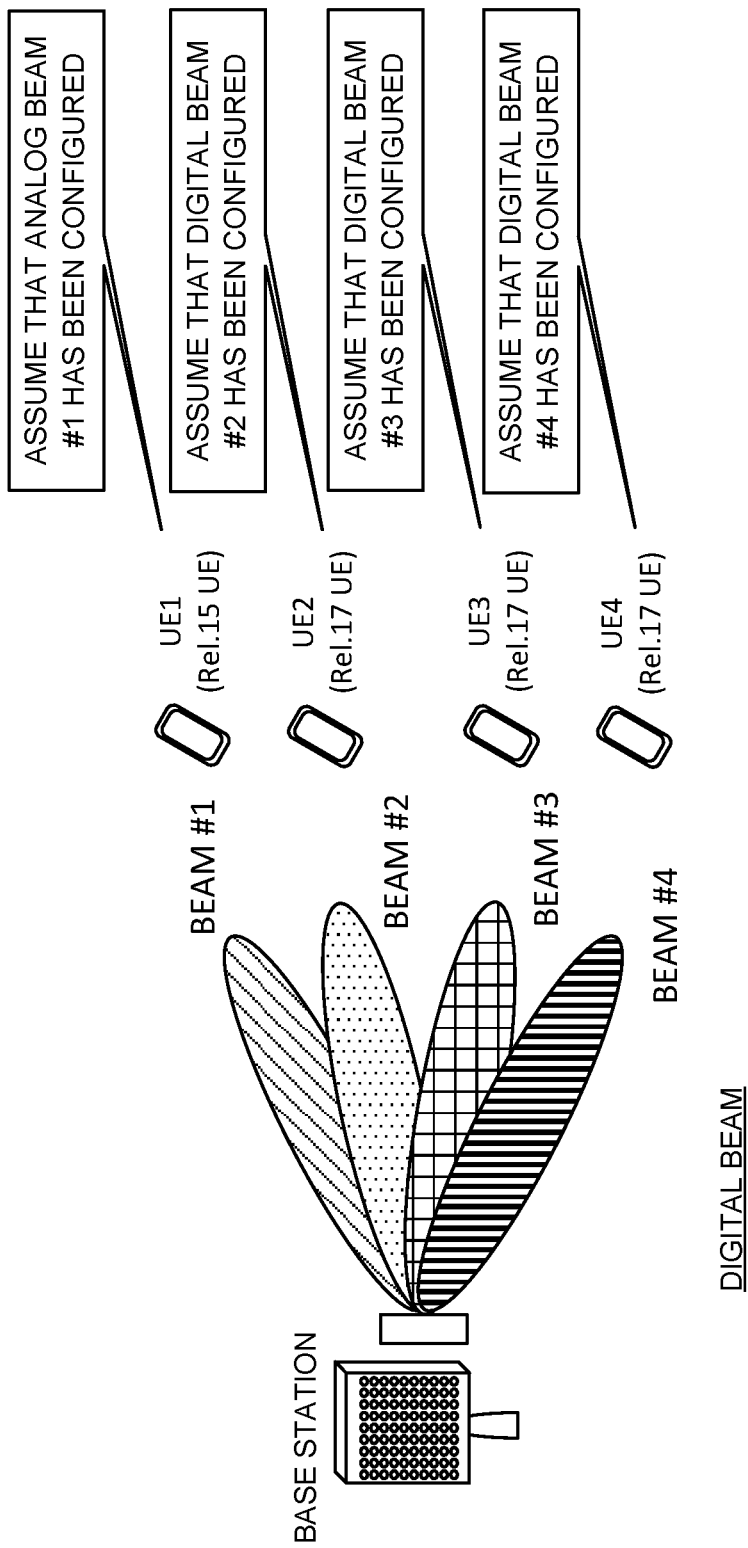
FIG. 8 is a diagram to show an example of assumption of beams according to the second embodiment.

FIG. 8 is a diagram to show an example of assumption of beams according to the second embodiment. The present example is an example similar to FIG. 3B, and thus overlapping description will not be repeated. The description here assumes a case in which the base station can generate digital beams #1 to #4 (can simultaneously perform transmission and reception by using beams #1 to #4).

In the present example, UE 1 is a UE according to an old release (for example, an Rel. 15 UE), UEs 2 to 4 are each a UE according to a new release (for example, a Rel. 17 UE).

The base station may transmit CSI-RS #1/TRS #1 by using beam #1 according to Rel. 15 specification for UE 1, and may configure CSI-RS #1/TRS #1 in a TCI state of the PDSCH/PDCCH (or the spatial relation of the SRS/PUSCH/PUCCH).

UE 1 may perform transmission and reception processing by assuming that there is a QCL relationship with the PDSCH/PDCCH (or the SRS/PUSCH/PUCCH) and the CSI-RS #1/TRS #1, based on the TCI state of the PDSCH/PDCCH (or the spatial relation of the SRS/PUSCH/PUCCH). UE 1 may assume that beam #1 is an analog beam even when actual beam #1 is a digital beam. UE 1 may assume that analog beam #1 has been configured.

The base station may transmit CSI-RS #2 (/#3/#4)/TRS #2 (/#3/#4) by using beam #2 (/#3/#4) to UEs 2 to 4, and configure CSI-RS #2 (/#3/#4)/TRS #2 (/#3/#4) for the TCI state of the PDSCH/PDCCH (or the spatial relation of the SRS/PUSCH/PUCCH).

UEs 2 to 4 may perform transmission and reception processing by assuming that there is a QCL relationship with the PDSCH/PDCCH (or the SRS/PUSCH/PUCCH) and CSI-RS #2 (/#3/#4)/TRS #2 (/#3/#4), based on the TCI state of the PDSCH/PDCCH (or the spatial relation of the SRS/PUSCH/PUCCH). UEs 2 to 4 may assume that digital beam #2 (/#3/#4) has been configured.

In the case as shown in FIG. 8, CSI-RS #1 for UE according to an old release and CSI-RS #2 for UE according to a new release may be controlled so as to be transmitted by using the same OFDM symbol. The UE may assume that a plurality of channels/RSs not in QCL-D are transmitted and received by using the same OFDM symbol. The UE may simultaneously form a plurality receive beams with digital beams.

When the CSI-RS #1 and the CSI-RS #2 are transmitted by using the same OFDM symbol, interference may be caused if orthogonality of such a plurality of digital beams for transmitting these is collapsed. Thus, countermeasures against such a situation will be described below.

[Orthogonality of Digital Beam]

For the UE, the first RS (also referred to as RS #1) transmitted by using digital beam #1 and the second RS (also referred to as RS #2) transmitted by using digital beam #2 may be configured. These RSs may be at least one of the SSB, the CSI-RS, the TRS, the DMRS of a certain channel (the PDCCH, the PDSCH, or the like), the CRS, and the like.

The resource of RS #1 and the resource of RS #2 may be configured for different OFDM symbols, or may be configured for the same OFDM symbols.

The UE may determine orthogonality between digital beam #1 and digital beam #2, based on RS #1 and RS #2. For example, the UE may derive whether or not there is orthogonality between digital beam #1 and digital beam #2 (or how much orthogonality there is therebetween) by receiving (measuring) RS #1 and RS #2.

For example, when the UE receives RS #1 and RS #2 by using the same symbol, the UE may measure an interference amount from RS #1 to RS #2, an interference amount from RS #2 to RS #1, or the like.

When the UE receives RS #1 and RS #2 by using different symbols, for example, the UE may measure the interference amount from digital beam #1 to digital beam #2 by receiving RS #1 by using UE digital beam #2' that is formed assuming base station digital beam #2.

The UE may report these measured interference amounts to the network. When a report is configured/indicated (triggered) for the UE by using higher layer signaling, physical layer signaling, or a combination of these, the UE may perform the reporting.

The UE may receive, from the network, information related to a beam (for example, a receive digital beam) to be applied at the time of measurement. The information may be a beam index, or may be an RS resource. The UE may assume that the UE applies a certain receive digital beam to reception of the RS resource, and when the RS resource is indicated as the information, the UE may perform measurement by using a receive digital beam corresponding to the RS resource.

Note that information related to the beam to be applied at the time of measurement may be a transmit beam (transmit digital beam) to be applied to the network (base station), or information (for example, a beam index, a TCI state, QCL, or the like) related to the transmit beam.

The information related to the beam to be applied at the time of measurement may be information (for example, a TCI state, spatial relation information, or the like) related to a certain QCL type. The certain QCL type may be, for example, a QCL type indicating that precoding (digital precoding) between a certain channel/signal and another channel/signal is the same, which may be referred to as QCL type E (QCL-E). Note that E may be another alphanumeric character.

Note that "precoding" of QCL-E may be interpreted as a spatial reception parameter ("Spatial Rx parameter") or a spatial transmission parameter ("Spatial Tx parameter"). The spatial reception parameter may be referred to as, for example, Spatial Rx parameter II or Spatial Tx parameter II, in order to make a distinction from the spatial reception parameter of QCL-D according to 3GPP Rel. 15.

For the UE, the receive digital beam to be applied at the time of reception of a certain DL channel/signal (for example, at least one of the PDCCH, the PDSCH, the CSI-RS, and the SSB) may be indicated from the network.

For the UE, the transmit digital beam to be applied at the time of transmission of a certain UL channel/signal (for example, at least one of the PUSCH, the PUCCH, and the SRS) may be indicated from the network.

The information related to indication of these beams may be, for example, a beam index, a TCI state, QCL, or the like. The UE may determine a digital beam to be applied to DL reception or UL transmission, based on the information.

The UE may receive reporting of information as to whether or not RS #1 and RS #2 of different digital beams are transmitted by using the same symbol (or RS #1 and RS #2 of different digital beams are received by using the same symbol) from the network by using higher layer signaling, physical layer signaling, or a combination of these.

For example, the UE may receive, from the network, reporting that RS #1 and RS #2 of different digital beams may be transmitted by using the same symbol (or RS #1 and RS #2 of different digital beams may be received by using the same symbol) in a specific slot. The UE may perform CSI measurement, interference measurement, interference control, or the like, based on the information.

A slot (radio resource) in which RS #1 and RS #2 of different digital beams are not transmitted by using the same symbol (or the UE does not receive RS #1 and RS #2 of different digital beams by using the same symbol) may be referred to as a protected slot, a protected resource, or the like.

In the protected slot/resource, even when orthogonality of the digital beams is collapsed, it is assumed that there is no influence of interference or there is little influence thereof.

A slot (radio resource) in which RS #1 and RS #2 of different digital beams are transmitted by using the same symbol (or the UE receives RS #1 and RS #2 of different digital beams by using the same symbol) may be referred to as a non-protected slot, a non-protected resource, or the like.

In the non-protected slot/resource, the RSs of different digital beams can be aggregated in a small number of symbols, and thus it is expected that throughput of data be enhanced when there is a little interference.

Note that it is assumed that an interference level of the protected slot/resource and an interference level of the non-protected slot/resource are different from each other. Thus, the UE may independently perform CSI measurement/reporting of the protected slot/resource and CSI measurement/reporting of the non-protected slot/resource.

[Rate Match of Channel/Signal of UE According to New Release]

When the CSI-RS of the UE according to an old release overlaps a specific channel/signal of the UE according to a new release (for example, resources thereof overlap), the UE may perform rate match of the specific channel/signal of the UE according to a new release (or may assume that rate match has been applied), or may perform puncture (or may assume that puncture has been applied).

Note that the CSI-RS according to the present disclosure may be interchangeably interpreted as a TRS. Rate match may be interchangeably interpreted as puncture.

For example, when the CSI-RS for the UE according to an old release overlaps the PDSCH for the UE according to a new release, the UE may perform rate match of the PDSCH of the UE according to a new release.

When the UE according to a new release receives reporting of information (for example, an index of the CSI-RS, time/frequency resource information, or the like) of the CSI-RS of the UE according to an old release, the UE according to a new release may receive the PDSCH by assuming that the UE according to a new release performs rate match of the PDSCH regarding the resource of the CSI-RS. For example, the UE according to a new release may perform rate match of the PDSCH around the overlapping part regarding the PDSCH that overlaps the CSI-RS of the UE according to an old release.

Figure 9:
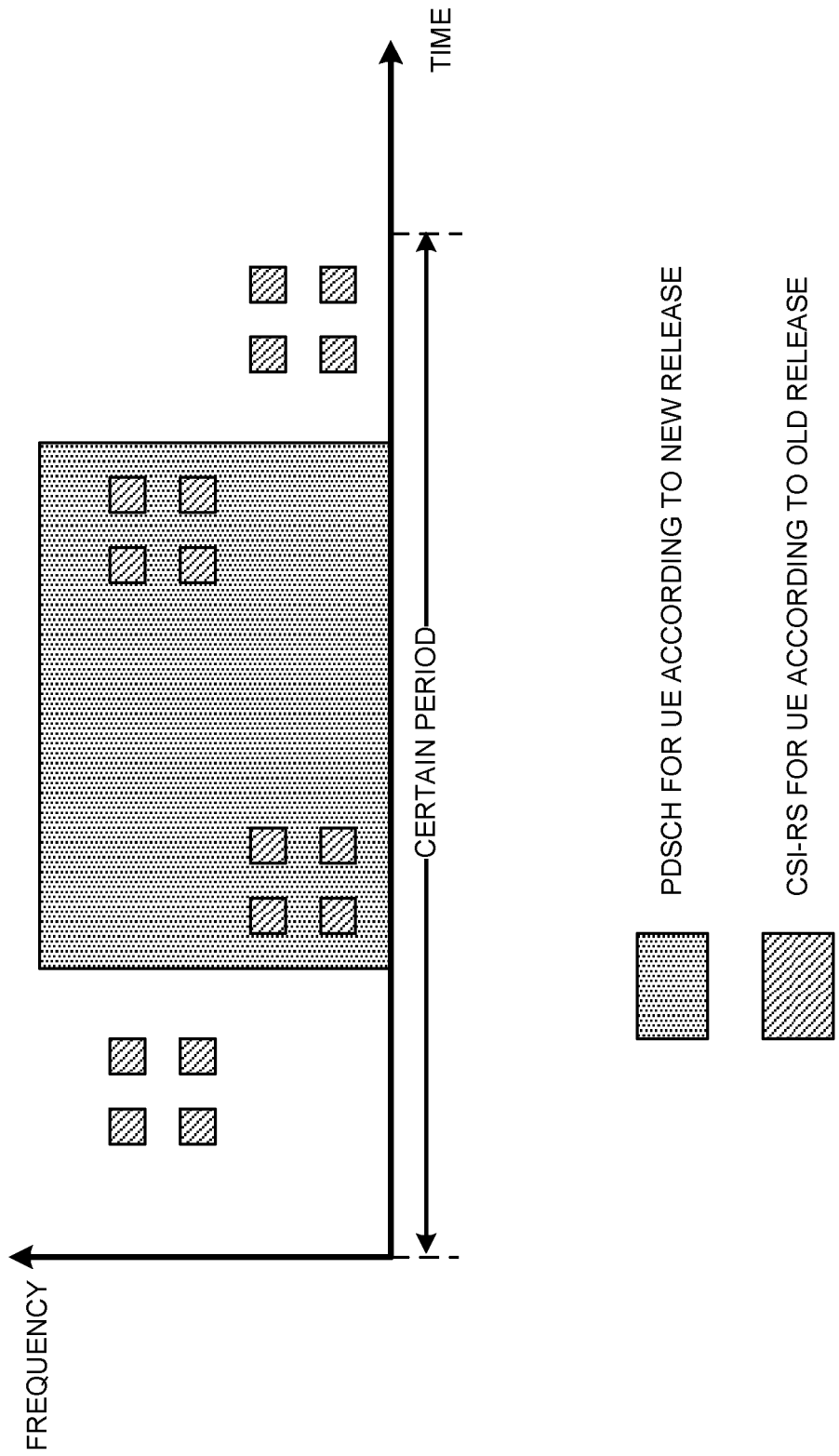
FIG. 9 is a diagram to show an example in which a channel/signal of a UE according to a new release is subjected to rate match.

FIG. 9 is a diagram to show an example in which a channel/signal of the UE according to a new release is subjected to rate match. The present example shows resource mapping of a certain serving cell in a certain period (for example, one or more slots, sub-slots, or subframes). In FIG. 9, parts of the CSI-RS of the UE according to an old release overlap the PDSCH of the UE according to a new release.

In this case, the UE according to a new release may apply rate match on the PDSCH that overlaps the CSI-RS of the UE according to an old release. The UE according to an old release can measure any CSI-RS of the UE according to an old release.

The UE according to a new release need not expect to receive any signal (for example, the DL channel/signal for the UE according to a new release (for example, the PDCCH, the PDSCH, the CSI-RS, the SSB, or the like)) in the CSI-RS resource of the UE according to an old release.

The UE according to a new release need not expect to transmit any signal (for example, the UL channel/signal for the UE according to a new release (for example, the PUSCH, the PUCCH, the SRS, or the like)) in the CSI-RS resource of the UE according to an old release.

For the UE, a zero power CSI-RS (ZP-CSI-RS) may be configured from the network. When the resource of the configured ZP-CSI-RS and the resource of the PDSCH overlap, the UE may perform rate match of the PDSCH. In other words, the ZP-CSI-RS resource may correspond to the resource for rate match of the PDSCH.

The UE according to a new release may assume the ZP-CSI-RS resource corresponding to the same time and frequency resource as the CSI-RS resource of the UE according to an old release is configured. For example, the UE according to a new release may assume that the ZP-CSI-RS resource is the same as the CSI-RS resource of the UE according to an old release in a certain period (for example, one slot), or may assume that the ZP-CSI-RS resource is the same as the CSI-RS resource of the UE according to an old release in at least the resource in which the PDSCH is allocated (scheduled). In the latter case, the UE according to a new release need not assume that the ZP-CSI-RS resource outside of the resource in which the PDSCH is scheduled is not the same as the CSI-RS resource of the UE according to an old release.

FIGS. 10A and 10B are each a diagram to show an example of the ZP-CSI-RS configured for the UE according to a new release. The present example is similar to FIG. 9, and thus overlapping description will not be repeated.

As shown in FIG. 10A, the ZP-CSI-RS resource for the UE according to a new release may be completely the same as the CSI-RS resource of the UE according to an old release in a certain period (for example, one slot).

As shown in FIG. 10B, the ZP-CSI-RS resource for the UE according to a new release may be the same as the CSI-RS resource of the UE according to an old release in the PDSCH resource for the UE according to a new release. It may be assumed that the ZP-CSI-RS resource for the UE according to a new release is not present in a region not overlapping the PDSCH resource for the UE according to a new release.

Note that the CSI-RS resource may be configured for a part of the frequency resources. For example, when the density of the CSI-RS resource is configured to 0.5, the CSI-RS resource may be transmitted in every other PRB in the frequency direction. The higher layer parameter indicating that the density of the CSI-RS resource is 0.5 may include information of an offset of a comb at the PRB level. The information of an offset of a comb at the PRB level may correspond to information as to whether the CSI-RS is occupied in odd-numbered (odd) RBs or occupied in even-numbered (even) RBs.

When the CSI-RS resource of the UE according to an old release is configured for a part of the frequency resources (for example, the density is configured to 0.5), the UE according to a new release may assume that the ZP-CSI-RS resource that at least includes the frequency resource of the PRB the same as the PRB in which the CSI-RS resource of the UE according to an old release is transmitted is configured.

Figure 11A:
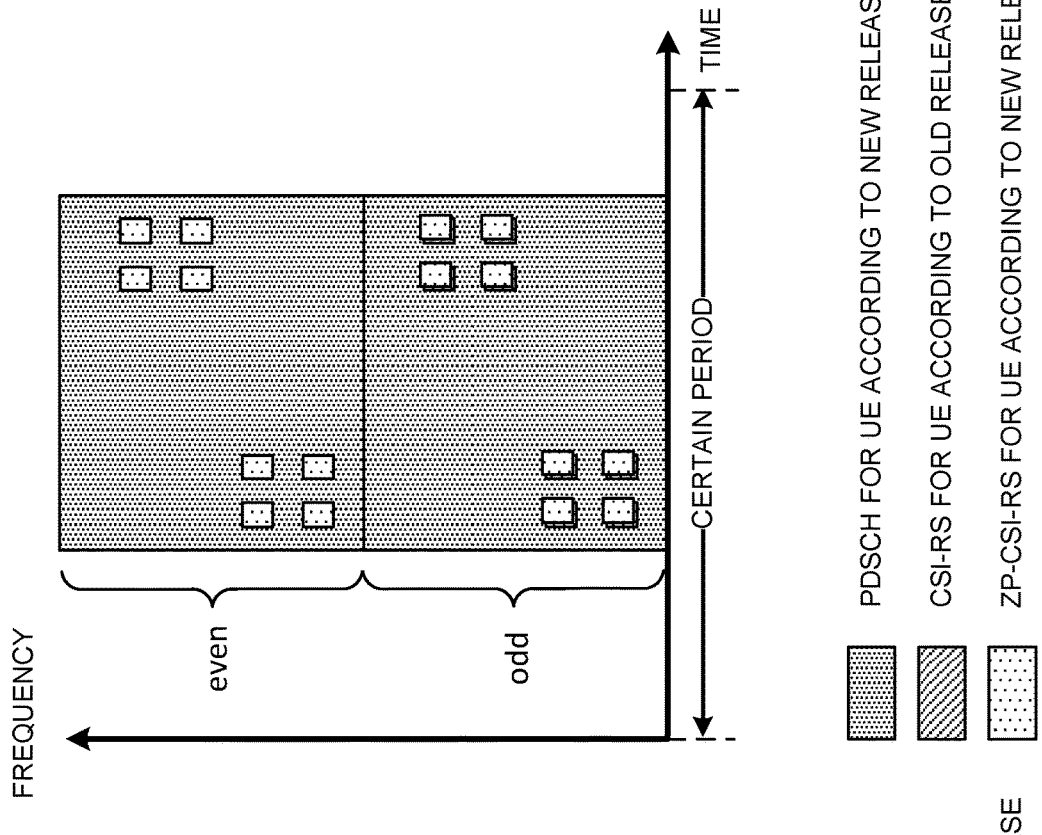
FIGS. 11A and 11B are each a diagram to show an example of the ZP-CSI-RS configured for the UE according to a new release.
Figure 11B:
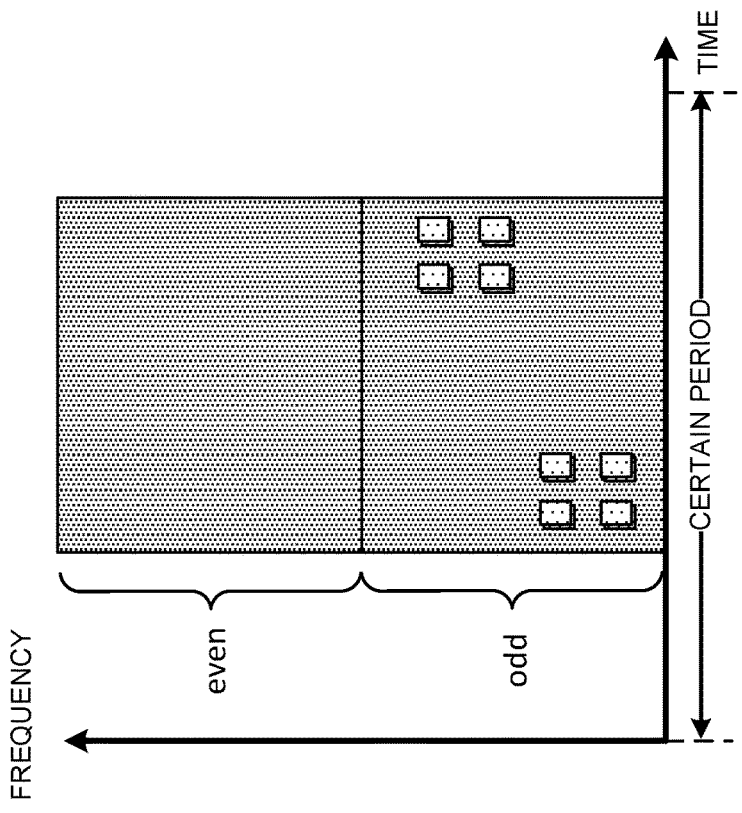

FIGS. 11A and 11B are each a diagram to show an example of the ZP-CSI-RS configured for the UE according to a new release. The present example is similar to FIG. 9, and thus overlapping description will not be repeated. The present example shows a case in which the CSI-RS resource of the UE according to an old release is configured in association with an odd-numbered PRB index (for example, density=0.5 and PRB offset=odd number).

As shown in FIG. 11A, the ZP-CSI-RS resource for the UE according to a new release may be completely the same as the CSI-RS resource of the UE according to an old release in a certain period (for example, one slot).

As shown in FIG. 11B, the ZP-CSI-RS resource for the UE according to a new release may be configured so as to include the CSI-RS resource of the UE according to an old release in a certain period (for example, one slot). In FIG. 11B, the ZP-CSI-RS resource for the UE according to a new release may be configured so as to include an even-numbered PRB index in which the CSI-RS resource of the UE according to an old release is not included.

Note that the PRB according to the present disclosure may be interpreted as a precoding resource block group (PRG). One PRG may include one or more PRBs to which the same precoding is applied.

According to the second embodiment described in the above, even when the UE according to a new release connects to the same serving cell as that of the UE according to an old release, each UE can perform appropriate communication.

ADDITIONAL NOTES

Each embodiment described above shows an example in which the first serving cell is a serving cell that is used by the UE according to an old release, and the second serving cell is a serving cell that is used by the UE according to a new release. However, this is not restrictive. For example, even when each of the first serving cell and the second serving cell is a serving cell that is used by the UE according to a new release, the beam control, the interference control, and the like may be performed based on the details of each embodiment according to the present disclosure.

In each embodiment described above, the CSI-RS may be interpreted as another reference signal, such as a DMRS and a PTRS for a certain channel (for example, the PDCCH, the PDSCH, the PUCCH, or the PUSCH).

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 12:
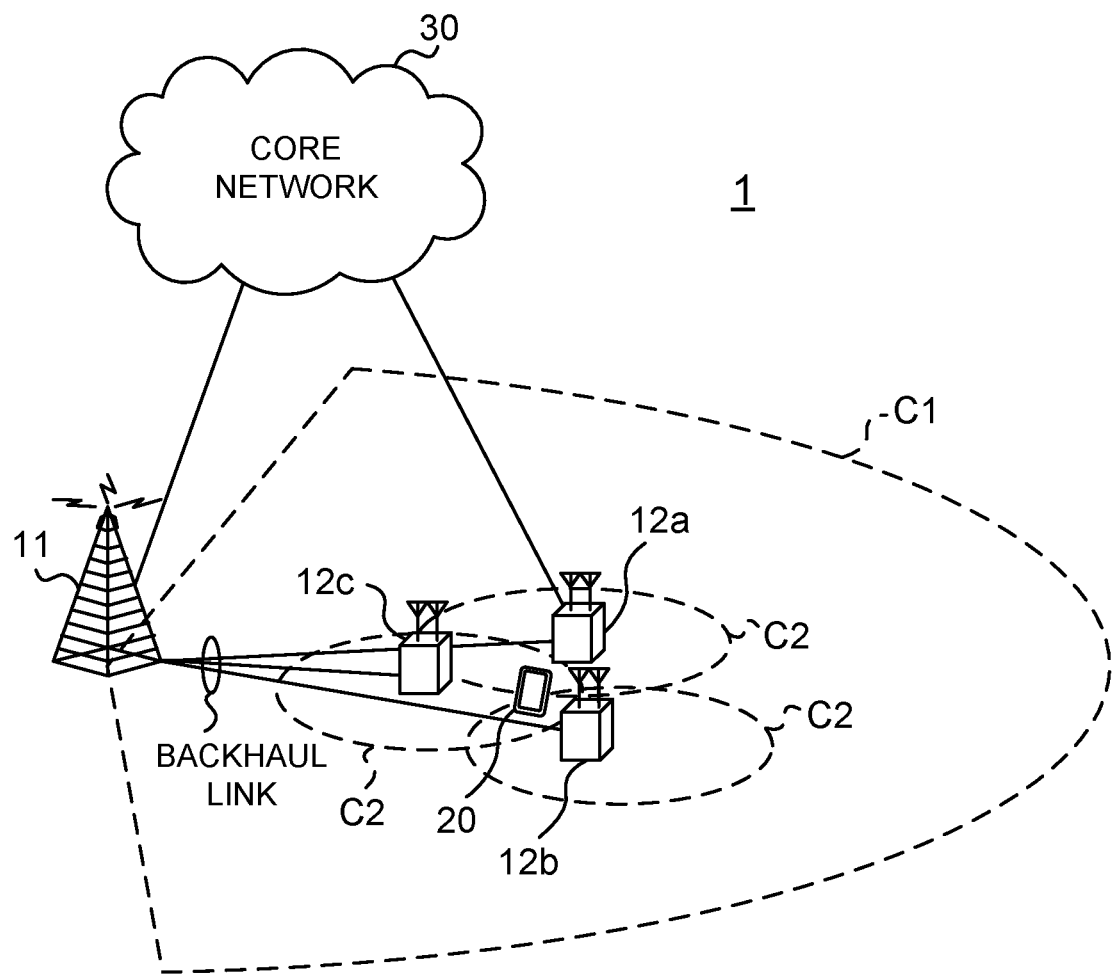
FIG. 12 is a diagram to show an example of a schematic structure of a radio communication system according to one embodiment.

FIG. 12 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 13:
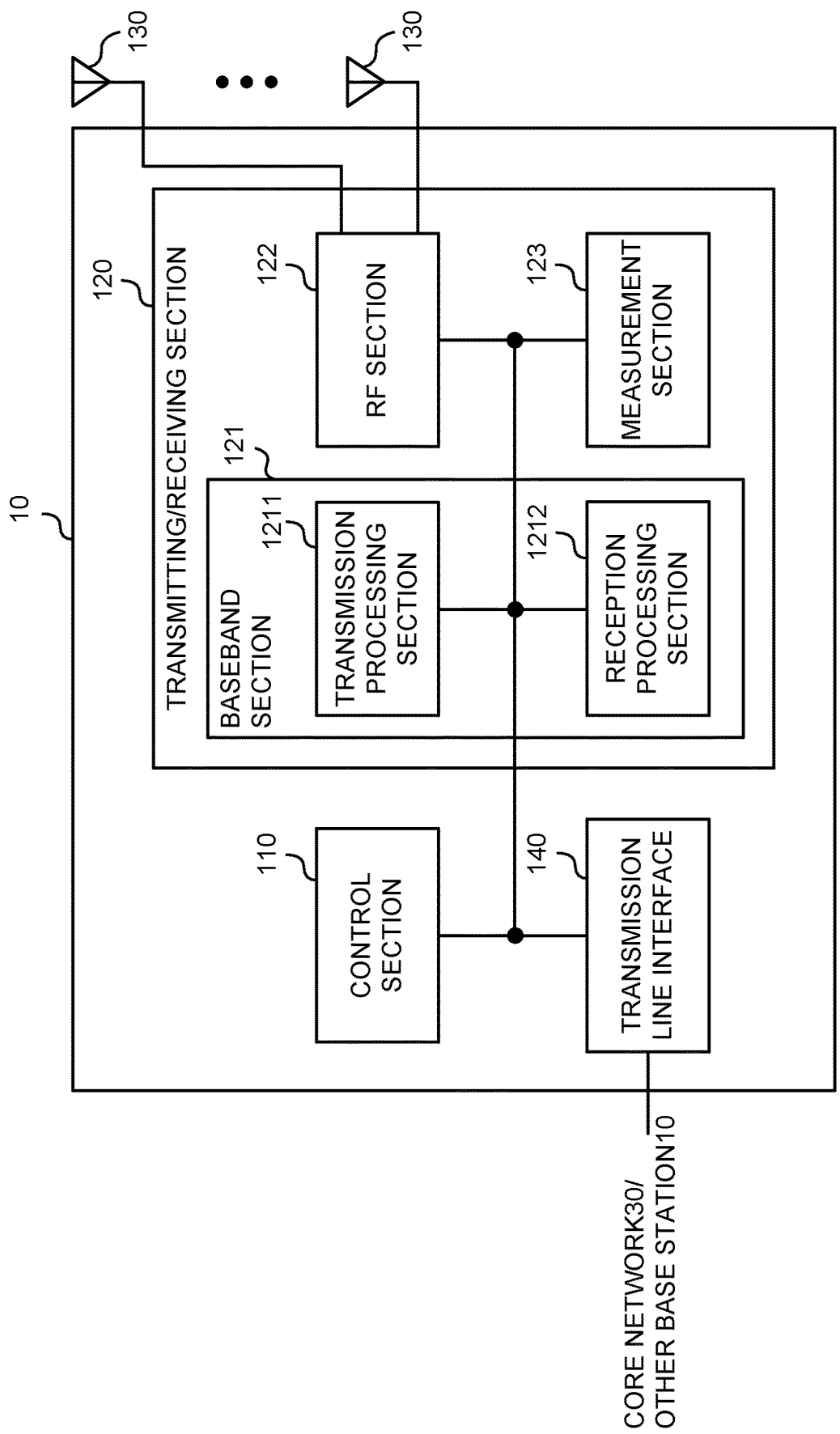
FIG. 13 is a diagram to show an example of a structure of a base station according to one embodiment.

FIG. 13 is a diagram to show an example of a structure of the base station according to one embodiment. The base station 10 includes a control section 110, a transmitting/receiving section 120, transmitting/receiving antennas 130 and a transmission line interface (communication path interface) 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward generated items to the transmitting/receiving section 120.

The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the control section 110 may perform control so that the user terminal 20 according to a new release connects to a serving cell different from that of the user terminal 20 according to an old release. The control section 110 may perform control so that the user terminal 20 according to a new release connects to a serving cell the same as that of the user terminal 20 according to an old release.

(User Terminal)

Figure 14:
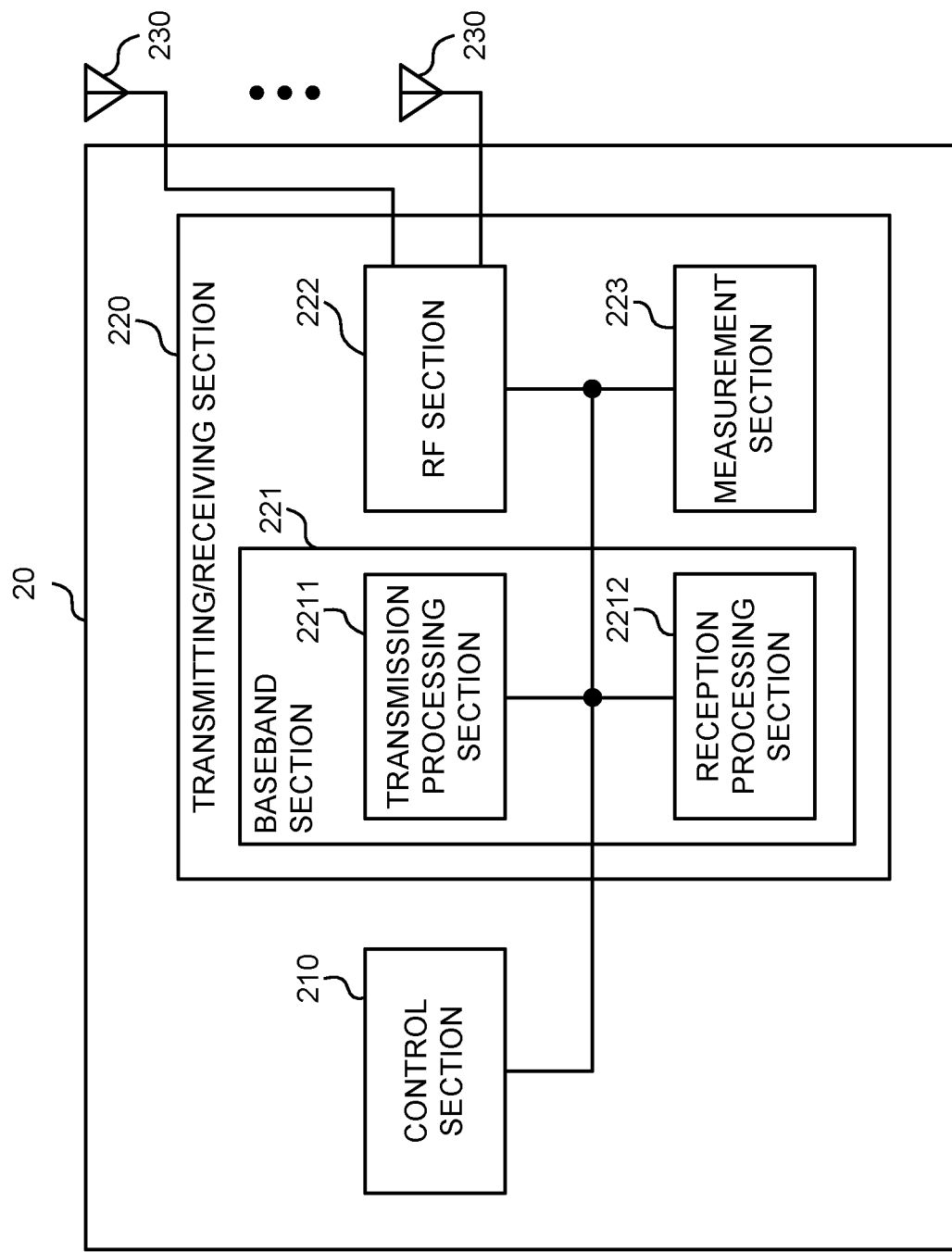
FIG. 14 is a diagram to show an example of a structure of a user terminal according to one embodiment.

FIG. 14 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the control section 210 may assume that different radio resources are allocated to a connected serving cell and another serving cell. In this case, the transmitting/receiving section 220 may limit transmission and reception of a certain channel or signal in a radio resource used by such another serving cell.

For example, the transmitting/receiving section 220 may assume that a shared channel (PDSCH/PUSCH) is not scheduled in the radio resource used by such another serving cell.

The transmitting/receiving section 220 may assume that a part of a reference signal (for example, a certain type of CSI-RS/SRS) is transmittable and/or receivable in the radio resource used by such another serving cell.

The transmitting/receiving section 220 need not monitor a downlink control channel (PDCCH) in the radio resource used by such another serving cell.

The transmitting/receiving section 220 may assume that the certain channel or signal in the radio resource used by such another serving cell and the same certain channel or signal in a radio resource other than the radio resource used by such another serving cell are different from each other in at least one of transmission power, received power, and energy.

The transmitting/receiving section 220 may receive a first reference signal transmitted in a connected serving cell and a second reference signal transmitted in another serving cell. In this case, the control section 210 may determine orthogonality of a beam (for example, a digital beam) to be applied to the first reference signal and a beam (for example, a digital beam) to be applied to the second reference signal, based on the first reference signal and the second reference signal.

The control section 210 may determine a receive digital beam to be applied at time of measurement of at least one of the first reference signal and the second reference signal, based on information related to the receive digital beam.

The control section 210 may control transmission and reception or measurement processing, based on information as to whether or not reference signals of different digital beams are transmitted by using a same symbol.

The control section 210 may perform control so as to independently perform measurement of channel state information in a slot in which reference signals of different digital beams are transmitted by using a same symbol and in a slot in which the reference signals of the different digital beams are not transmitted by using the same symbol.

The transmitting/receiving section 220 may receive information related to a channel state information reference signal (CSI-RS) of a terminal according to an old release. In this case, the control section 210 may perform control of applying rate match or puncture to a specific channel or signal regarding a resource of the CSI-RS of the terminal according to the old release.

The information related to the CSI-RS of the terminal according to the old release may be information of a zero power CSI-RS (ZP-CSI-RS). When a resource of the ZP-CSI-RS overlaps a resource of a downlink shared channel (PDSCH), the control section 210 may perform control of applying rate match or puncture to the downlink shared channel.

The control section 210 may assume that the resource of the ZP-CSI-RS is same as the resource of the CSI-RS of the terminal according to the old release in at least the resource to which the downlink shared channel is allocated.

When the resource of the CSI-RS of the terminal according to the old release is configured for a part of a frequency resource, the control section 210 may assume that the resource of the ZP-CSI-RS at least including the frequency resource same as the frequency resource in which the resource of the CSI-RS of the terminal according to the old release is transmitted is configured.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 15:
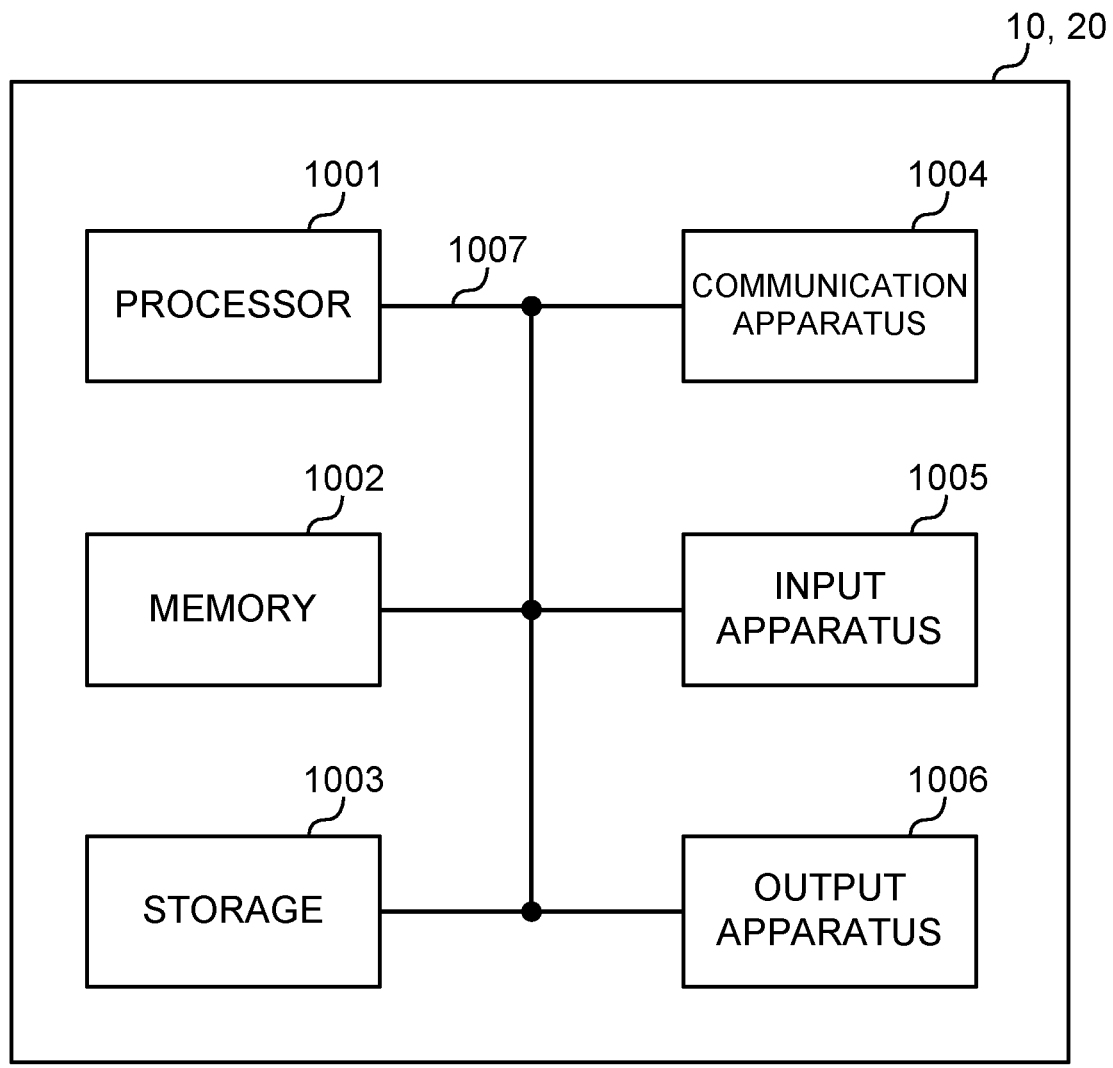
FIG. 15 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 15 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table.

The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives a higher layer signaling indicating a radio resource used by a second serving cell that is different from a first serving cell; and
   a processor that determines that, in the first serving cell, not to monitor a physical downlink control channel (PDCCH) when a radio resource for the PDCCH overlaps with the radio resource used by the second serving cell, in time domain.

2. The terminal according to claim 1, wherein the processor determines that a physical uplink shared channel (PUSCH) is not scheduled in the first serving cell in the radio resource used by the second serving cell.

3. The terminal according to claim 1, wherein the processor determines that synchronization signal block (SSB) is received in the first serving cell in the radio resource used by the second serving cell.

4. The terminal according to claim 1, wherein the processor determines that a signal power in the radio resource used by the second serving cell and a signal power in other radio resource are separately configured.

5. A radio communication method for a terminal, the radio communication method comprising:
   receiving a higher layer signaling indicating a radio resource used by a second serving cell that is different from a first serving cell; and
   determining that, in the first serving cell, not to monitor a physical downlink control channel (PDCCH) when a radio resource for the PDCCH overlaps with the radio resource used by the second serving cell, in time domain.

6. A system comprising a terminal and a base station, wherein:
   the terminal comprises:
      a receiver that receives a higher layer signaling indicating a radio resource used by a second serving cell that is different from a first serving cell; and
      a processor that determines that, in the first serving cell, not to monitor a physical downlink control channel (PDCCH) when a radio resource for the PDCCH overlaps with the radio resource used by the second serving cell, in time domain, and
   the base station comprises:
      a transmitter that transmits the higher layer signaling.

* * * * *